No. 631,374. Patented Aug. 22, 1899.
J. C. MEEM.
GAME.
(Application filed Nov. 9, 1898.)
(No Model.)
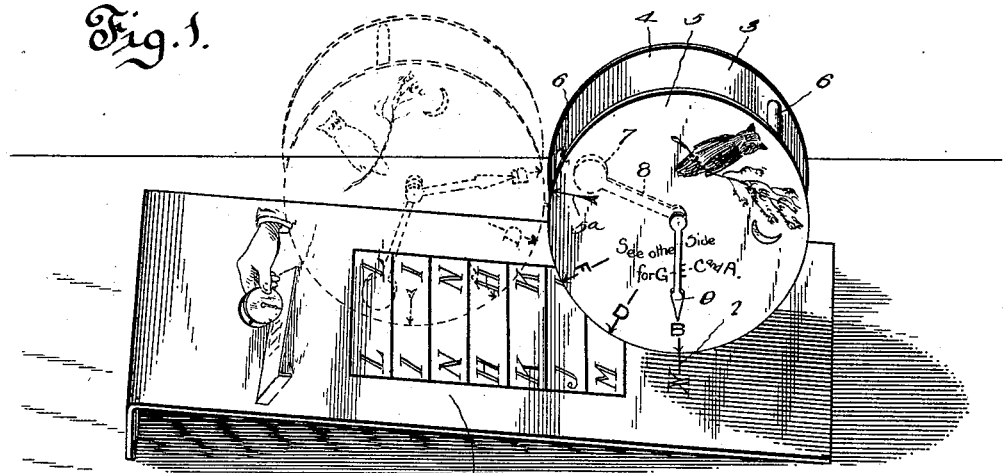
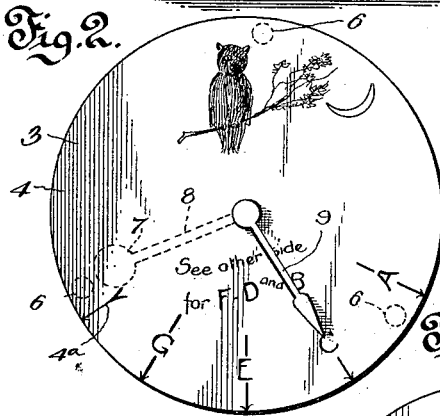
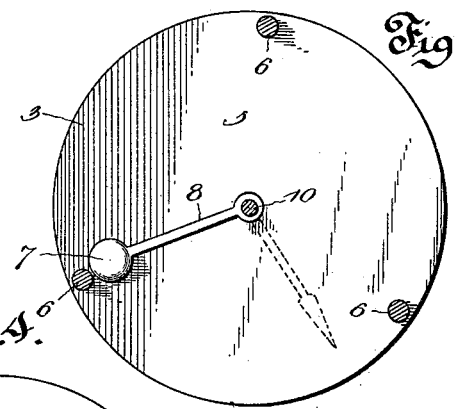
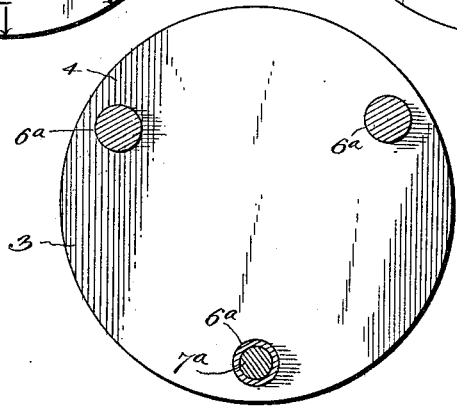
Witnesses                                   James C. Meem, Inventor.
By his Attorneys,
THE NORRIS PETERS CO., PHOTO-LITHO., WASHINGTON, D. C.

UNITED STATES PATENT OFFICE.

JAMES COWAN MEEM, OF NEW YORK, N. Y.

GAME.

SPECIFICATION forming part of Letters Patent No. 631,374, dated August 22, 1899.

Application filed November 9, 1898. Serial No. 695,958. (No model.)

*To all whom it may concern:*

Be it known that I, JAMES COWAN MEEM, a citizen of the United States, residing at New York, (Brooklyn,) in the county of Kings and State of New York, have invented a new and useful Game, of which the following is a specification.

My invention relates to games and toys, and has for its object to provide a simple and entertaining device consisting, essentially, of a chart provided with spaces or graduations containing characters, phrases, or sentences, such as queries, and a removable, preferably rolling, indicator adapted to traverse the chart and provided with marks or characters for designating different graduations or spaces of the chart to indicate, respectively, the characters, phrases, or sentences thereof, the device being adapted for use as a fortune-telling or other game.

Further objects and advantages of this invention will appear in the following description, and the novel features thereof will be particularly pointed out in the appended claims.

In the drawings, Figure 1 is a perspective view of the game apparatus, showing in full lines the relative positions of the parts when the indicator is mounted upon the chart preparatory to releasing the former and showing in dotted lines the position of the indicator when it is turned to rest. Fig. 2 is a view of the opposite side of the indicator. Fig. 3 is a sectional view of the same. Fig. 4 is a similar view showing a modified form of weight which is permanently located upon the indicator.

Similar reference characters indicate corresponding parts in all the figures of the drawings.

In the preferred embodiment of my invention the chart 1 is disposed upon an incline, is provided with a plane upper surface, and is suitably inscribed or marked to represent a ladder or scale, which is divided by transverse lines to form graduated steps or spaces wherein in the drawings are indicated the characters M J K, &c. Also parallel with the lowermost terminal cross line or bar and spaced therefrom is a starting or balk line 2. (Indicated in the drawings by the characters X X.) In coöperative relation with the chart and adapted to traverse the plane surface thereof is a rolling object 3, consisting of parallel side disks 4 and 5, connected by cross-bars 6, the peripheries of the disks being adapted to rest upon the surface of the chart, as indicated in Fig. 1. Located at a suitable point near the periphery of the rolling object is a weight 7 to arrange the center of gravity of the object eccentrically, and when the object is disposed upon the chart with this center of gravity elevated or arranged above the lowermost points of the disks, as with one of the characters A B C, &c., upon the balk-line X X, the weight will tend to turn the object and thereby cause it to traverse the chart in the direction of or parallel with the scale even when the chart is arranged in an inclined position upward from said line X X, as indicated in the drawings. The characters A B C, &c., designate starting-pointers and are spaced apart around a selected portion of the periphery of the object, alternate letters being arranged upon the exterior surfaces of the said disks 4 and 5; but in addition to these character-designated pointers are chart-indicating pointers 4ª and 5ª, arranged, respectively, upon the disks 4 and 5, and when the object comes to rest or is in a state of stable equilibrium, with the weight or center of gravity at the lowermost point of its movement, said chart-indicating pointers will point toward graduations or spaces of the scale and will thus designate certain characters, phrases, or sentences in said scale.

It is obvious that the characters both in the chart-scale and upon the movable object may be varied to suit the peculiarities of the game to be played by means of the apparatus, and therefore I have deemed it unnecessary to illustrate any specific relation between the characters, the drawings showing an embodiment of my invention.

The weight 7 as preferably constructed is movable, the same being carried by an arm 8, fulcrumed concentric with the object 3 and adapted to be changed in position manually to vary the center of gravity of the object, and hence the point with relation to the periphery of the object at which the latter will stop upon the surface of the chart; but said weight may be fixed in position, as indicated in the modification shown in Fig. 4, by locating it, as at 7ª, in a hollow transverse connecting-rod or spacing-block 6ª, by which the disks 4 and 5 are held in parallelism.

One method of operating the apparatus above described consists in arranging the dart or pointer of a selected character upon the periphery of the movable object in registration with the balk-line upon the chart, the disks or sides of the rolling object being parallel with the side edges of the chart, and then releasing said object to allow it to roll upwardly upon the surface of the chart until the object reaches a state of equilibrium, when one of the chart-designating pointers will point toward one of the characters of the scale upon the chart, and thus indicate a character, phrase, or sentence of said chart, whereby a statement is made relative to a participant in the game or a question is asked of such participant, &c. In order, however, that a selected character upon the periphery of the movable object may be designated, I preferably employ a character-designating pointer 9, also fulcrumed upon the movable object concentric with its periphery and adapted to be moved to register with either of the said characters on the disk, and, as illustrated in the drawings, this pointer 9 may be attached to the spindle 10 of the weight-carrying arm 8, whereby both elements may be adjusted simultaneously.

In addition to the changing of the characters to suit the peculiarities of the game to be played by means of the apparatus, it will be understood that various changes in the form, proportion, and the minor details of construction may be resorted to without departing from the spirit or sacrificing any of the advantages of this invention.

Having described my invention, what I claim is—

1. A game apparatus having a chart provided with a scale, and an eccentrically-weighted rolling object to traverse the chart, and provided with means for indicating graduations of the scale on the chart, substantially as specified.

2. A game apparatus having an inclined chart provided with a scale of characters, and an eccentrically-weighted rolling object to traverse the chart and provided with means for indicating characters thereon, substantially as specified.

3. A game apparatus having a chart provided with a scale and a balk-line, and an eccentrically-weighted rolling object to traverse the chart, and provided with a plurality of character-designated pointers and a chart-indicating pointer, substantially as specified.

4. A game apparatus having a chart provided with graduations, and an eccentrically-weighted rolling object having spaced parallel disks bearing pointers to indicate graduations on the chart, substantially as specified.

5. A game apparatus having a rolling object provided with a character-indicating pointer, and an eccentric weight movably mounted upon the object for manual adjustment to vary the position of rest of the object and held at any desired adjustment against accidental displacement, substantially as specified.

6. A game apparatus having a rolling object, and an eccentric weight provided with an arm pivotally mounted upon the object for adjustment to vary the position of the weight and frictionally held at the desired adjustment, substantially as specified.

7. A game apparatus having a rolling object provided with an eccentrically-attached weight, and a character-designating pointer adjustably mounted upon said rolling object for registration with either of a plurality of characters thereon, substantially as specified.

8. A game apparatus having a rolling object, an adjustable weight arranged eccentrically upon said object, and a pivotal character-designating pointer mounted upon the object and connected with said weight for simultaneous adjustment therewith, substantially as specified.

9. A game apparatus having a rolling object, a movable weight arranged eccentrically upon said object, and a character-designating pointer also mounted upon the object, said weight and pointer being carried by a common spindle, substantially as specified.

In testimony that I claim the foregoing as my own I have hereto affixed my signature in the presence of two witnesses.

JAMES COWAN MEEM.

Witnesses:
WM. T. BRUORTON,
JOHN L. PITTALUGA.